(12) United States Patent
Ljung (10) Patent No.: US 10,219,304 B2
(45) Date of Patent: Feb. 26, 2019

(54) OPERATING A TERMINAL DEVICE IN A WIRELESS COMMUNICATION SYSTEM

(71) Applicant: Sony Corporation, Tokyo (JP)

(72) Inventor: Rickard Ljung, Helsingborg (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 152 days.

(21) Appl. No.: 14/373,760

(22) PCT Filed: May 16, 2013

(86) PCT No.: PCT/IB2013/000949
§ 371 (c)(1),
(2) Date: Jul. 22, 2014

(87) PCT Pub. No.: WO2014/184600
PCT Pub. Date: Nov. 20, 2014

(65) Prior Publication Data
US 2016/0157273 A1    Jun. 2, 2016

(51) Int. Cl.
*H04W 4/00* (2018.01)
*H04W 76/10* (2018.01)
(Continued)

(52) U.S. Cl.
CPC ........... *H04W 76/10* (2018.02); *H04W 60/00* (2013.01); *H04W 88/04* (2013.01)

(58) Field of Classification Search
CPC .............................. H04W 76/02; H04W 60/00
(Continued)

(56) References Cited

U.S. PATENT DOCUMENTS 6,954,612 B2 * 10/2005 Cheng ................... H04W 74/08
370/338
8,437,691 B2 * 5/2013 Saitou ................ H04B 7/15507
455/101
(Continued)

FOREIGN PATENT DOCUMENTS

CN          102780993       11/2012
EP           1447921         8/2004
(Continued)

OTHER PUBLICATIONS

3rd Generation Partnership Project, Technical Specification Group Services and System Aspects, Study on architecture enhancements to support Proximity Services, 3GPP TR 23.703, V0.3.0, Apr. 2013, pp. 1-26.
(Continued)

*Primary Examiner* — Amancio Gonzalez
(74) *Attorney, Agent, or Firm* — Tucker Ellis LLP (57) ABSTRACT

The present invention relates to a method for operating a terminal device (106) of a wireless communication system (100). The terminal device (106) is connected to a base station (101) of the wireless communication system (100). According to the method, an intermediate node functionality is provided at the terminal device (106). The intermediate node functionality is configured to forward communication data received from the base station (101) to a further terminal device (107) and to forward communication data received from the further terminal device (107) to the base station (101). Upon receiving a permission from the base station (101) to activate the intermediate node functionality, the terminal device (106) activates the intermediate node functionality.

7 Claims, 4 Drawing Sheets

(51) Int. Cl.
*H04W 88/04* (2009.01)
*H04W 60/00* (2009.01)

(58) Field of Classification Search
USPC ........................................... 455/435.1
See application file for complete search history.

(56) References Cited

U.S. PATENT DOCUMENTS

| | | |
|---|---|---|
| 2002/0003826 A1 | 1/2002 | Yoneda |
| 2004/0106373 A1 | 6/2004 | Shimada et al. |
| 2005/0003826 A1 | 1/2005 | Khitrik et al. |
| 2005/0227616 A1 | 10/2005 | Takatani et al. |
| 2007/0081479 A1* | 4/2007 | Kang .............. H04B 7/026 370/310 |
| 2008/0219214 A1 | 9/2008 | Chen et al. |
| 2009/0197624 A1* | 8/2009 | Kwak ............ H04W 72/0406 455/517 |
| 2009/0239466 A1 | 9/2009 | Saitou et al. |
| 2009/0310561 A1 | 12/2009 | Grob et al. |
| 2010/0325506 A1 | 12/2010 | Cai et al. |
| 2011/0159874 A1 | 6/2011 | Ninagawa |
| 2011/0242970 A1 | 10/2011 | Prakash et al. |
| 2012/0289148 A1 | 11/2012 | Aaron |
| 2012/0315841 A1 | 12/2012 | Zhou et al. |

FOREIGN PATENT DOCUMENTS

| | | |
|---|---|---|
| JP | 2004056589 A | 2/2004 |
| JP | 2009010977 A | 1/2009 |
| JP | 2009231990 A | 10/2009 |
| JP | 2010056857 A | 3/2010 |
| JP | 2013528000 A | 7/2013 |
| RU | 2221335 C2 | 10/2004 |
| WO | 2011119767 A1 | 9/2011 |

OTHER PUBLICATIONS

3rd Generation Partnership Project, Qualcomm Europe, Architecture of Relay Architecture B and security aspects, 3GPP TSG-RAN WG2 Meeting #66, Nov. 9-13, 2009, R3-093015, pp. 1-5, Jeju, Korea.

Intellectual Property Office of China First Notification of Office Action dated Feb. 14, 2018 (9 pgs.) and Translation (16 pgs.); Application No. 201380076664.X; Applicant: Sony Corporation.

* cited by examiner

OPERATING A TERMINAL DEVICE IN A WIRELESS COMMUNICATION SYSTEM

FIELD OF THE INVENTION

The present invention relates to a method for operating a terminal device of a wireless communication system, especially to a method for improving a coverage in the wireless communication system. The present invention relates furthermore to a method for operating a base station of a wireless communication system, and the present invention relates to a terminal device, for example a cellular phone, and a base station implementing the methods.

BACKGROUND OF THE INVENTION

Figure 1:
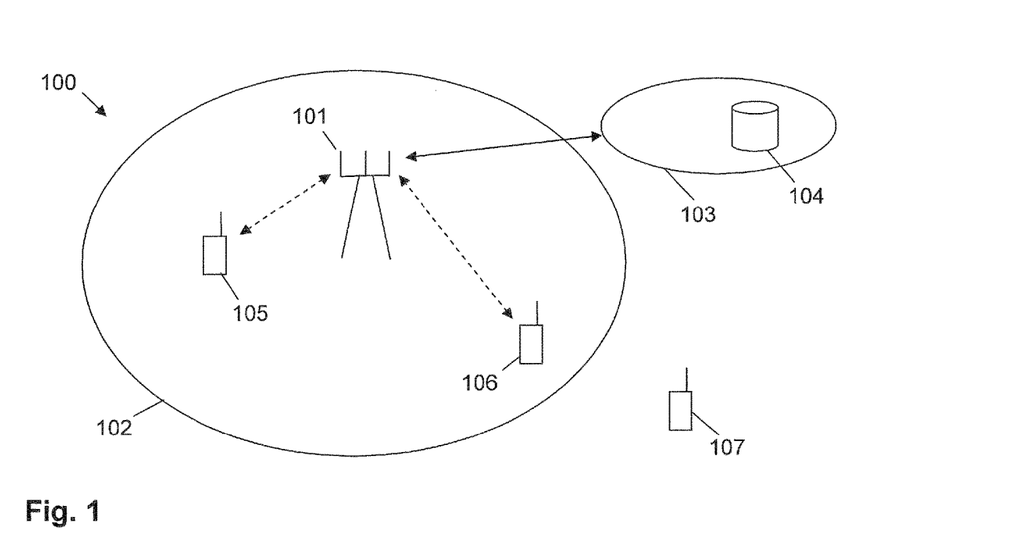
FIG. 1 shows a wireless communication system and a terminal device outside a coverage of the wireless communication system.

A wireless communication system, for example a cellular-based wireless telecommunication network, which is also called mobile communication system, may consist of different communication units, so-called network nodes. An exemplary wireless communication system 100 is shown in FIG. 1. The network nodes may comprise for example a base station 101 acting as an interface between an operator core network 103 and the access network. The base station 101 may provide a coverage within a radio cell 102. Further network nodes may comprise for example terminal devices 105 and 106 acting as the end devices providing radio access communication capabilities. The terminal devices 105 and 106 may be used for example as a machine type communication device or a consumer oriented device, such as a mobile phone or a smart phone. As shown in FIG. 1, a terminal device 107 outside the radio cell 102 is not covered by the base station 101 and therefore cannot participate in communication of the wireless communication system 100. For increasing or improving the coverage of the wireless communication system 100, further base stations may be installed providing additional radio cells. As an alternative, repeaters may be installed at specific locations. With a repeater, the signals transmitted between base station 101 and the terminal 107 may be repeated or sent again, in order to improve network coverage.

Beside the general coverage extension functionality achievable by a stationary deployed repeater, there may be other reasons for using a repeater. One specific use case may be for example that the wireless communication system shall be able to dynamically increase its network coverage to support emergency services required for public safety requirements. Therefore, in such a network or communication system it may be required to quickly expand network coverage and capacity at specific locations, even if these locations are at the border or outside the ordinary network coverage area. In another scenario it may be required that the coverage of a radio cell should be able to dynamically increase due to a failure of a neighboring base station. However, repeaters and additional base stations cause cost and maintenance.

Therefore, it is an object of the present invention to provide an improved method to dynamically increase the coverage of a radio cell of a wireless communication system as needed and at low cost.

SUMMARY OF THE INVENTION

According to the present invention, this object is achieved by a method for operating a terminal device of a wireless communication system as defined in claim 1, a method for operating a base station of a wireless communication system as defined in claim 8, a terminal device for a wireless communication system as defined in claim 11 and a base station for a wireless communication system as defined in claim 14. The dependent claims define preferred and advantageous embodiments of the invention.

According to an aspect of the present invention, a method for operating a terminal device of a wireless communication system is provided. The terminal device is connected to a base station of the wireless communication system. According to the method, the terminal device provides an intermediate node functionality. The intermediate node functionality enables the terminal device to forward communication data received from the base station to a further terminal device and to forward communication data received from the further terminal device to the base station. Furthermore, according to the method, the terminal device receives a permission to activate the intermediate node functionality from the base station and upon reception of the permission from the base station, the terminal device activates the intermediate node functionality. With the intermediate node functionality of the terminal device, the terminal device enables the further terminal device to communicate with the base station although the further terminal device may be outside the coverage of the base station. Thus, the coverage of the base station may be extended. However, the terminal device needs the permission from the base station to activate the intermediate node functionality which enables the base station to control the coverage extension. For example, the coverage extension may be allowed only in case of an emergency or for specific services or in case a neighboring base station fails.

According to an embodiment, forwarding the communication data received from the base station to the further terminal comprises receiving a radio signal from the base station which comprises digital data and transmitting a radio signal which comprises the digital data in an unchanged form as the digital data has been received from the base station. Furthermore, forwarding the communication data received from the further terminal device to the base station comprises receiving a radio signal from the further terminal device which comprises digital data and transmitting a radio signal which comprises the digital data in an unchanged form as the digital data has been received from the further terminal device. In other words, the digital data forwarded by the intermediate node functionality from the base station to the further terminal device and vice versa, is not modified, and thus the terminal device acts as a repeater. The received radio signal and the transmitted radio signal may use the same frequency band or may use different frequency bands. However, from the point of view of the base station, the digital data are transparently passed through the terminal device to the further terminal device and vice versa. After activating the intermediate node functionality in the terminal device, the data communication between the base station and the further terminal device can be performed as if the further terminal device would be within the original coverage of the base station.

According to another embodiment, the wireless communication network comprises a cellular communication network, for example a cellular-based wireless telecommunication network like for example 3GPP (3rd Generation Partnership Project) LTE (Long Term Evolution) systems. The terminal device is registered at a radio cell provided by the base station. The intermediate node functionality comprises a base station functionality. The base station functionality is configured to establish a further radio cell and to provide a cell identifier for the further radio cell. The cell identifier of the further radio cell is different from a cell identifier of the radio cell of the base station. The further terminal device which is located inside a radio range of the terminal device, registers at the further radio cell. Thus, the terminal device acts as a small base station providing the further small radio cell, a so-called femto-cell, causing an improved coverage to the wireless communication system. Data communication between the base station functionality of the terminal device and the further terminal device is performed as usual in cellular communication net-works. The communication between the base station functionality of the terminal device and the base station of the wireless communication system is also performed as usual in a cellular communication network. However, the base station functionality of the terminal device may have a reduced functionality, for example the base station functionality of the terminal device may not provide billing information and may provide communication data to an emergency service in the wireless communication system only. However, the base station functionality provided by the terminal device may comprise a full functionality without any restrictions.

According to a further embodiment, the method comprises detecting the further terminal device via a direct radio communication between the terminal device and the further terminal device. The further terminal device is located within a radio range of the terminal device. Upon detection of the further terminal device, the terminal device requests at the base station the permission to activate the intermediate node functionality. The direct radio communication between the terminal device and the further terminal device may comprise a message from the further terminal device indicating that the further terminal device is not within a radio range of the base station or is not in contact with any base station. Thus, based on a direct device-to-device communication between the terminal device and the further terminal device, the further terminal device may indicate that it does not have contact to the base station and/or wants to have contact to a base station, and based on this information, the terminal device requests at the base station the permission to extend the coverage of the radio cell provided by the base station by activating the intermediate node functionality. In other words, the device-to-device communication is used to discover and determine a suitable terminal device to become an intermediate node such as a repeater or a base station. By adding a protocol element to the communication between the base station and the terminal device, the terminal device can request activating the intermediate node functionality and the base station can acknowledge or refuse the request. When the request is granted, the terminal device activates the intermediate node functionality and may work as a repeater or a base station thus including the further terminal device into the wireless communication system via the base station.

According to a further embodiment of the method, configuration data is transmitted from the base station to the terminal device. The configuration data configures the intermediate node functionality of the terminal device. The configuration data may comprise a maximum output power of a radio signal for forwarding communication data received from the base station to the further terminal device. By configuring the maximum output power, the base station may control the coverage extension provided by the terminal device. As an alternative or additionally, the configuration data comprises a cell identifier to be used by the intermediate node functionality when the intermediate node functionality comprises the base station functionality. In other words, when the terminal device acts as a further base station, the base station controls the cell identifier used by the further base station. As an alternative or additionally, the configuration data may comprise a neighbor cell identifier of a neighbor base station. The neighbor base station is a base station located in the neighborhood of the sending base station. Information about base stations in the neighborhood of a base station are communicated between the base stations and distributed to terminal devices to improve a transition of a terminal device from one radio cell to another radio cell. Therefore, providing the neighbor cell identifier as configuration data to the terminal device acting as a further base station, the terminal device can provide this information to the further terminal device for improving a cell change of the further terminal device. Furthermore, additionally or as an alternative, the configuration data may comprise a frequency band for a radio signal for forwarding communication data received from the base station to the further terminal device. By configuring the frequency band to be used by the terminal device for forwarding communication data, for example when the terminal device is acting as a repeater, frequency interference may be avoided.

In another embodiment, the method further comprises receiving from the base station a message to deactivate the intermediate node functionality. Upon receiving the message from the base station, the terminal device deactivates the intermediate node functionality. Thus, the base station maintains control of the coverage provided by the base station.

According to another aspect of the present invention, the method for operating a base station of a wireless communication system is provided. According to the method, the base station sends to a terminal device a permission to activate an intermediate node functionality provided at the terminal device. The intermediate node functionality enables the terminal device to forward communication data received from the base station to a further terminal device and, in vice versa, to forward communication data received from the further terminal device to the base station. Thus, the base station can request the terminal device to act as a repeater or a base station of a femto-cell to extend coverage of the wireless communication system.

According to an embodiment, the base station receives from the terminal device a request for the permission to activate the intermediate node functionality, and the base station sends the permission to activate the intermediate node functionality to the terminal device upon receiving this request from the terminal device. For example, when the terminal device has detected a further terminal device which is out of reach of the base station, the terminal device may request at the base station to get an allowance to activate the intermediate node functionality to include the further terminal device into the coverage of the base station. Upon receiving the request from the terminal device, the base station may decide if it wants to extend the coverage, for example based on a current load of the base station or a state of the wireless communication system, for example if the wireless communication system is in an emergency state in which emergency calls also from terminal devices outside the regular coverage shall be served.

According to a further embodiment, the base station sends configuration data to the terminal device for configuring the intermediate node functionality. The configuration data comprises at least one of the following group:
 a maximum output power of a radio signal for forwarding communication data received from the base station to the further terminal device, a cell identifier to be used by the intermediate node functionality in case the terminal device acts as a base station, a neighbor cell identifier of a neighbor base station which is located in the neighborhood of the base station, and a frequency band for a radio signal to be used by the terminal device for forwarding communication data to the further terminal device.

According to another embodiment, the base station sends a message to deactivate the intermediate node functionality to the terminal device. Thus, the base station may keep control of the coverage provided by the base station in combination with the terminal device. For example, the base station may enable coverage extension as described above for specific services or in specific states only. For example, the coverage extension may be provided for communication data relating to a voice communication between the further terminal device and an emergency service provided by the wireless communication system. Thus, emergency calls from the further terminal device may be handled via the intermediate node functionality of the terminal device and by the base station. As described above, the wireless communication system may comprise a cellular-based wireless telecommunication network. In emergency situations, especially when for example a part of the telecommunication network fails, emergency calls should be nevertheless be served. This may be accomplished by the above-described methods enabling the wireless communication system to dynamically extend the coverage of a base station in combination with terminal devices registered at the base station.

According to another aspect of the present invention, a terminal device for a wireless communication system is provided. The terminal device comprises a transceiver for establishing a data communication between the terminal device and a base station of the wireless communication system and for establishing a data communication between the terminal device and a further terminal device. The communication between the terminal device and the further terminal device is also called a device-to-device communication. Such a device-to-device communication (D2D communication) is already proposed for 3GPP standards. The terminal device comprises furthermore a processing circuit configured to receive from the base station a permission to activate an intermediate node functionality provided at the terminal device. The intermediate node functionality is configured to forward communication data received from the base station to the further terminal device and to forward communication data received from the further terminal device to the base station. The processing circuit is furthermore configured to activate the intermediate node functionality upon receiving the permission from the base station.

According to an embodiment, the terminal device is configured to perform the above-described methods and embodiments. Therefore, the terminal device may comprise also the above-described advantages.

Furthermore, the terminal device may comprise a mobile phone, a personal digital assistant, a tablet computer, a laptop computer or a notebook computer.

According to another aspect, a base station for a wireless communication system is provided. The base station comprises a transceiver for establishing a data communication between the terminal device and the base station, and a processing circuit. The processing circuit is configured to send to the terminal device a permission to activate an intermediate node functionality provided at the terminal device. The intermediate node functionality enables the terminal device to forward communication data received from the base station to a further terminal device and to forward communication data received from the further terminal device to the base station. The base station may be configured to perform the above-described methods and embodiments and comprises therefore the above-described advantages.

Although specific features described in the above summary and the following detailed description are described in connection with specific embodiments and aspects of the present invention, it should be understood that the features of the embodiments and aspects may be combined with each other unless specifically noted otherwise.

BRIEF DESCRIPTION OF THE DRAWINGS

The present invention will now be described in more detail with reference to the accompanying drawings.

DETAILED DESCRIPTION OF PREFERRED EMBODIMENTS

In the following, exemplary embodiments of the invention will be described in more detail. It has to be understood that the features of the various exemplary embodiments described herein may be combined with each other unless specifically noted otherwise. Same reference signs in the various drawings refer to similar or identical components.

FIG. 1 shows a wireless communication system 100, for example a cellular-based wireless telecommunication network. The communication system 100 may comprise a plurality of base stations. One of these base stations is shown as base station 101 in FIG. 1. The base stations may communicate with each other via wireless radio communications or via an operator core network 103 which comprise wireless and wired connection. The operator core network 103 may be connected a wired communication system, for example the internet. The operator core network 103 may comprise several services, for example an emergency service 104 directing emergency calls to a fire service or a police service. The base station 101 provides a radio cell 102 in which terminal devices 105 and 106 may communicate directly with the base station 101 via a radio frequency communication as indicated by the dashed arrows. A terminal device outside the radio cell 102, for example the terminal device 107, cannot communicate with the base station 101 due to insufficient radio frequency range.

Figure 2:
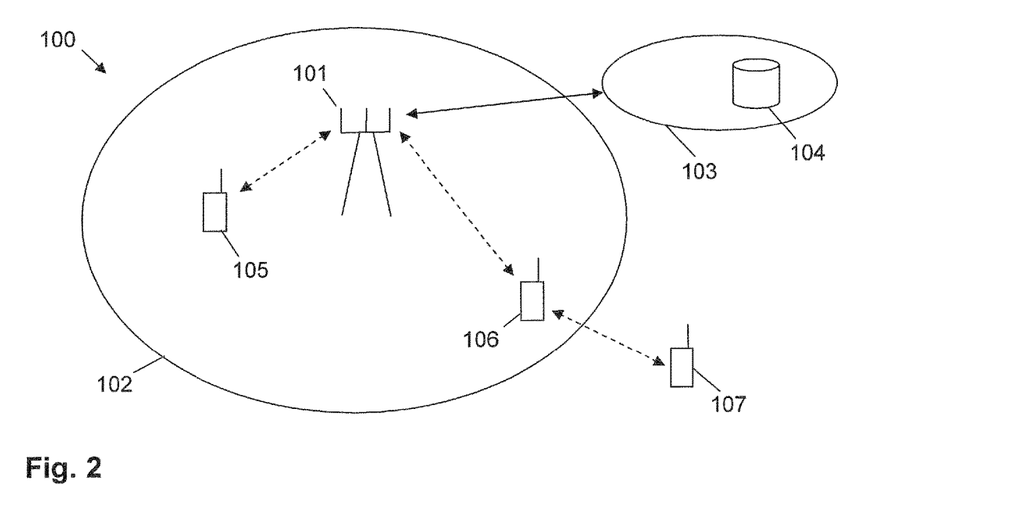
FIG. 2 shows the wireless communication system of FIG. 1, in which a terminal device acts as a repeater for extending a coverage of the wireless communication system according to an embodiment of the present invention.

FIG. 2 shows schematically how to extend the coverage provided by the base station 101 in such a way that the terminal device 107 can communicate in the wireless communication system 100. In one or more areas within or outside existing network coverage 102 the terminal devices 105-107 are using a so-called device-to-device (D2D) communication to discover that they are within a radio frequency range of each other. In FIG. 2 the terminal devices 106 and 107 may discover that they are within range of each other (dashed arrow). The concept of device-to-device discovery is currently being discussed and standardized within the 3$^{rd}$ Generation Partnership Project (3GPP). One example is the requirement document for device-to-device communication being defined in 3GPP TS22.278. These terminal devices 106 and 107 may be terminal devices used for public safety, for example police, fire department and so on, but they are not limited to the public safety usage, and may comprise private use devices, like mobile phones or smart phones. However, when limiting the service to public safety, the required mechanisms for charging, billing and so on will be significantly relaxed.

In the device-to-device communication one or more terminal devices may signal to other terminal devices whether it has access to the existing cellular communication network. One of these terminal devices, for example terminal device 106, is identified to potentially be used as a repeater to provide communication capabilities for other terminal devices in the device-to-device communicating group, for example terminal device 107. This terminal device 107 now can be served by the repeated signal from terminal device 106 and needs not to be served directly by the base station 101.

Figure 3:
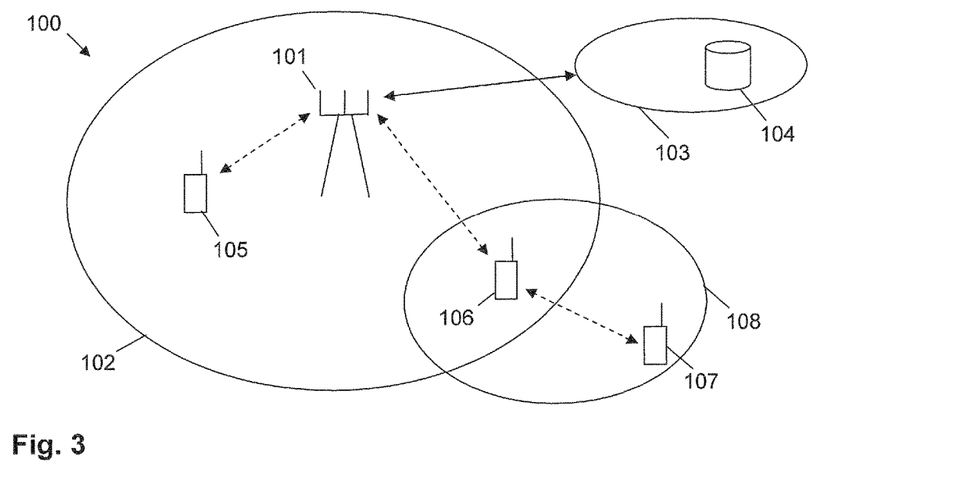
FIG. 3 shows the wireless communication system of FIG. 1, in which a terminal device acts as a base station for extending a coverage of the wireless communication system according to an embodiment of the present invention.

Another way to extend the coverage of the wireless communication system 100 is shown in FIG. 3. Instead of acting as a repeater, the terminal device 106 may act as a further base station with its own closed subscriber group. Thus, the terminal device 106 provides a radio cell 108 within the direct reach of the radio frequency range of the terminal device 106. Such a small radio cell 108 may be called femto-cell. Hence, instead of acting as a repeater, the terminal device 106 will have its own cell identifier and its own authentication and authorization functionality. The terminal device 106 uses its existing radio link to the base station 101 as a backhaul for access to the operator core network 106. All communication in the link between the base station 101 and the terminal device 106 looks from the point of view of the base station 101 like communication from the terminal device 106 only.

Figure 4:
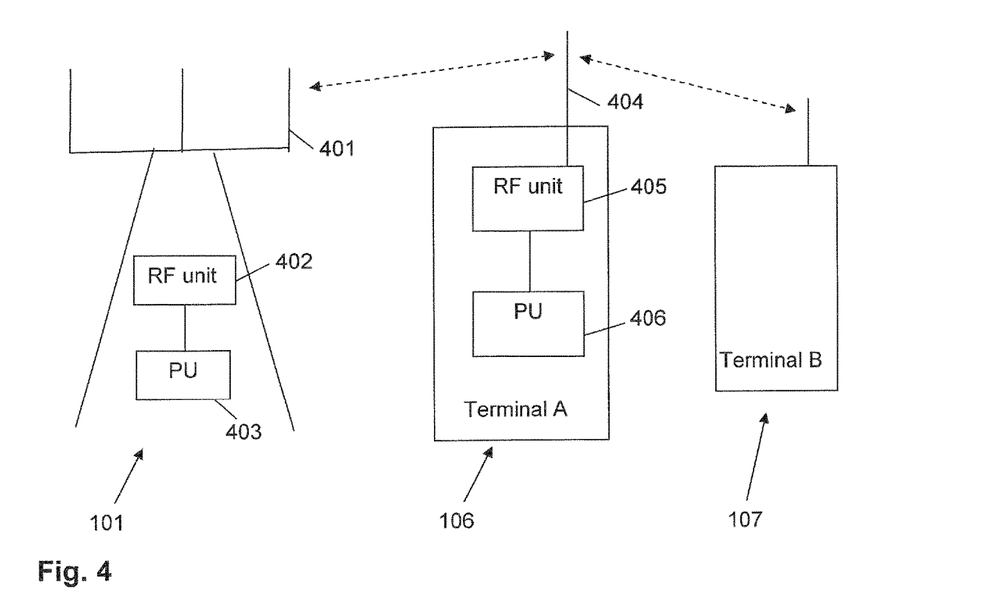
FIG. 4 shows a terminal device and a base station according to embodiments of the present invention.

FIG. 4 shows the base station 101 and the terminal device 106 in more detail. The base station 101 comprises a radio frequency unit 402 coupled to an antenna 401 of the base station 101 for establishing a data communication between the base station 101 and a terminal device, for example the terminal device 106. The radio frequency unit 402 is configured to receive and send communication data from and to the terminal devices within the radio cell 102 and is therefore also called transceiver. The base station 101 comprises furthermore a processing circuit 403 for handling the communication data, registering terminal devices and so on. The terminal device 106 comprises an antenna 404, a radio frequency unit 405 coupled to the antenna 404, and a processing circuit 406. The radio frequency unit 405 is configured to establish a data communication between the terminal device 106 and the base station 101 and is furthermore configured to establish a data communication between the terminal device 106 and another terminal device, for example the terminal device 107, when the terminal device 107 is within a radio frequency range of the terminal device 106. In the following, the terminal device 106 which is located within the radio cell 102 of the base station 101 will be called terminal device A and the terminal device 107 which is located outside the radio cell 102 will be called terminal device B.

Figure 5:
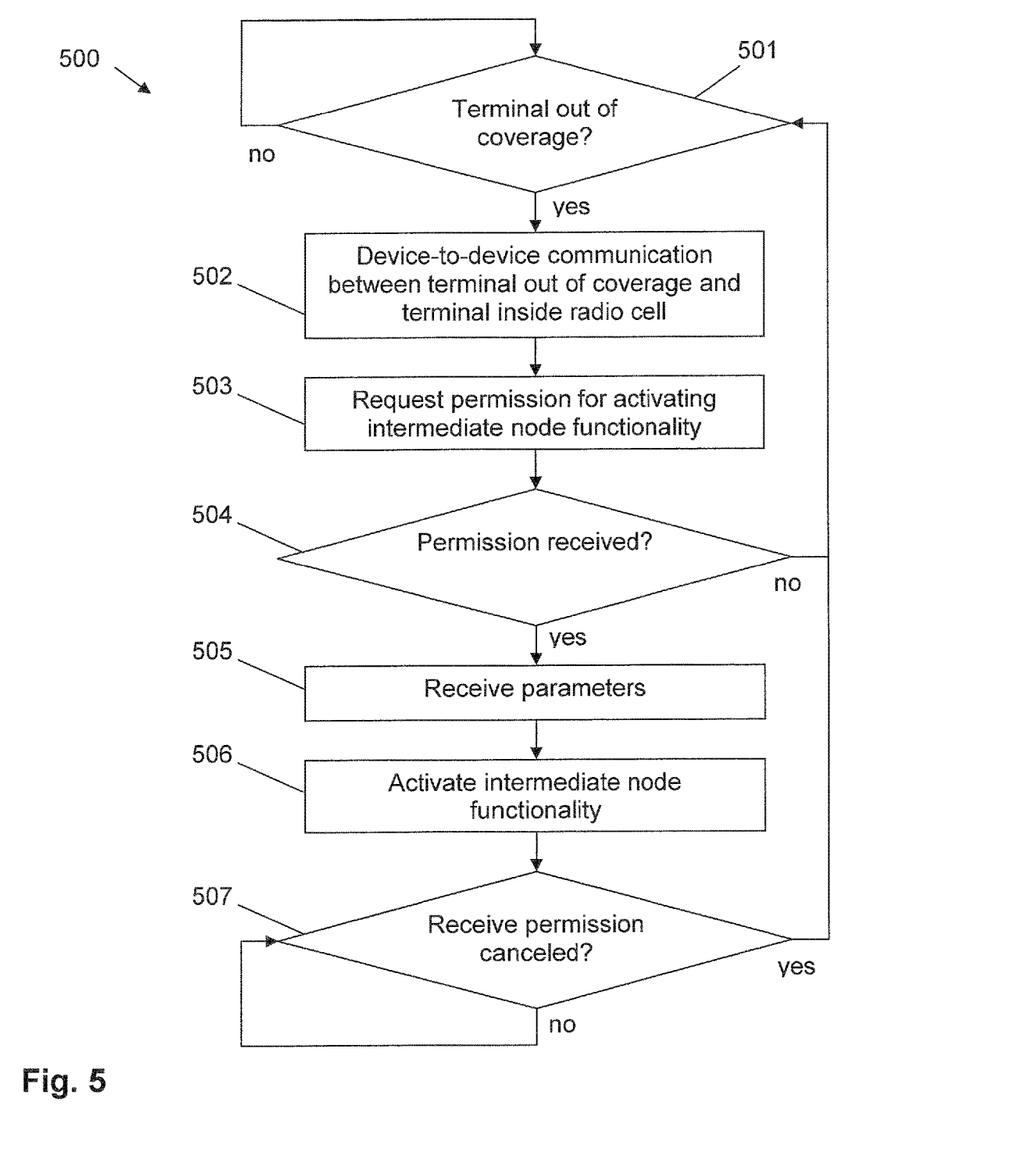
FIG. 5 shows a flow chart comprising method steps according to an embodiment of the present invention.

Extending the coverage of the wireless communication system 100 as described above in connection with FIGS. 2 and 3 will now be described in more detail in connection with FIG. 5. FIG. 5 shows a method 500 comprising method steps 501-507. In step 501 a device-to-device communication is established between terminal devices. Via the device-to-device communication terminal device A 106 is discovered to be used as a potential repeater or base station to provide a data communication with the base station 101 for other devices within a radio frequency range of the terminal device A which are out of coverage of the wireless communication system. For example, if terminal device B 107 is detected to be out of coverage of the wireless communication system 100 in step 501, this is communicated in step 502 via the device-to-device communication between terminal device B 107 and terminal device A 106, which is inside the radio cell 102. Then, in step 503, terminal device A 106 sends a request to the base station 101 to get a permission for activating an intermediate node functionality of the terminal device A 106. The intermediate node functionality may comprise for example the repeater functionality described in connection with FIG. 2 or the base station functionality described in connection with FIG. 3. In step 504 the terminal device A 106 receives an answer from the base station 101 on the request. If the base station 101 does not give the permission and therefore does not acknowledge to activate the intermediate node functionality, the method 500 is continued in step 501. If an acknowledgment is received from the base station 101 in step 504, the method 500 is continued in step 505 in which the terminal device A 106 receives parameters for configuring the intermediate node functionality from the base station 101. The parameters may comprise for example a parameter instructing the terminal device A 106 to act as a repeater or to act as a base station. Furthermore, the parameters may define a maximum output power of a radio signal for forwarding communication data from the base station 101 to the terminal device B 107, a cell identifier to be used by the terminal device A 106 in case it is acting as a base station, a neighbor cell identifier of a neighbor base station located in the neighborhood of the base station 101, and a frequency band for a radio signal for forwarding communication data from the base station 101 to the terminal device B 107. In step 506 the intermediate node functionality is activated in the terminal device A 106. The intermediate node functionality may be performed for example in the processing circuit 406 of the terminal device A 106. When the terminal device A 106 is acting as a repeater, the terminal device A 106 may receive a radio signal comprising digital data from the base station 101 and forward the digital data in an unchanged form as received from the base station 101 to the terminal device B 107. Therefore, from the point of view of the terminal device B 107, there is a transparent communication between the base station 101 and the terminal device B 107. When the terminal device A 106 acts as a base station, the terminal device B 107 may register at the base station functionality of terminal device A 106 and may communicate with the terminal device A 106 like with any other base station.

As long as the intermediate node functionality is active in terminal A 106, the coverage of the wireless communication system 100 is extended such that it covers the terminal device B 107. At any time, the base station 101 may send a message to the terminal device A 106 indicating to deactivate the intermediate node functionality and thus cancelling the permission to act as a repeater or a base station (step 507). If such a message is received, terminal device A 106 deactivates the intermediate node functionality and the method 500 is continued in step 501.

Figure 6:
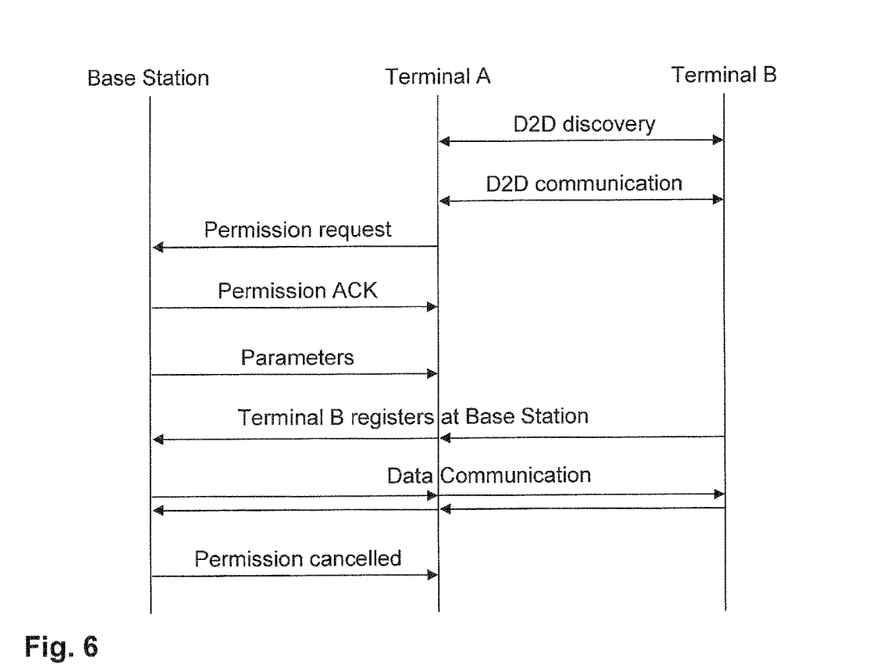
FIG. 6 shows a structure of a communication between a base station and terminal devices according to an embodiment of the present invention.
Figure 7:
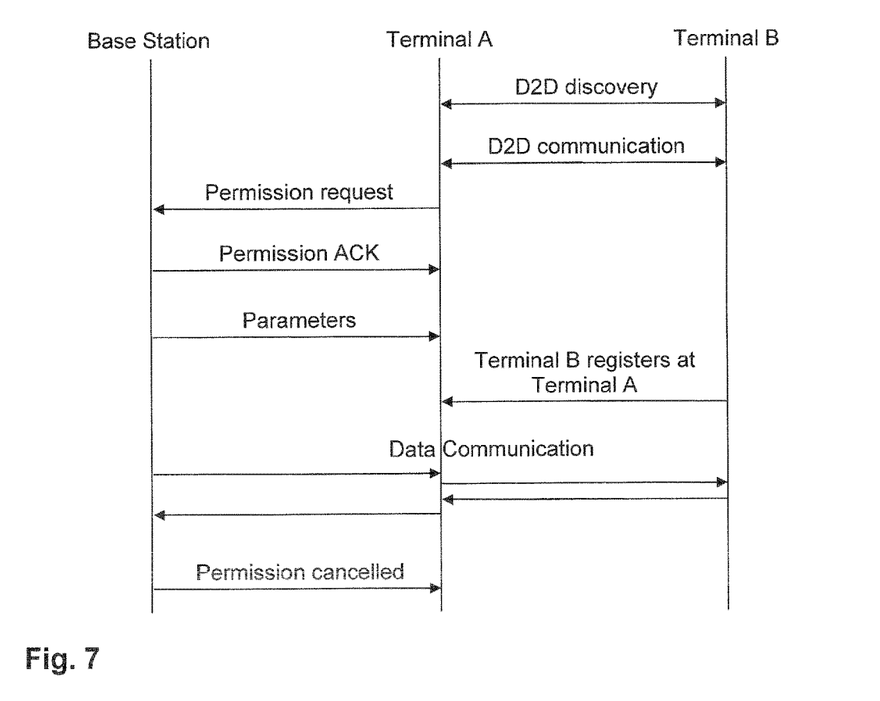
FIG. 7 shows a structure of a communication between a base station and terminal devices according to a further embodiment of the present invention.

A communication structure for the above-described method is illustrated in FIGS. 6 and 7. In FIG. 6 the terminal device A 106 acts as a repeater, and in FIG. 7 the terminal device A 106 acts as a base station. First, the terminal devices A and B discover each other when they are within a radio frequency reach of each other (D2D discovery). Via the device-to-device communication, terminal device B may indicate that it does not have a connection to a wireless communication system (D2D communication). Therefore, terminal device A sends a permission request to the base station and receives a permission acknowledge (ACK) from the base station to activate its intermediate node functionality. Furthermore, the terminal device A receives parameters from the base station to configure the intermediate node functionality.

In the example shown in FIG. 6, the intermediate node functionality comprises a repeater functionality. Therefore, terminal device A transparently forwards communication data between the base station and the terminal device B. Hence, terminal device B registers via the terminal device A at the base station and a data communication between the base station and the terminal device B can be performed. When the base station sends a message to the terminal device A for cancelling the permission for acting as a repeater, terminal device A deactivates the repeater functionality and the data communication between the base station and the terminal device B is interrupted.

In the example shown in FIG. 7, the terminal device A acts as a base station. Therefore, the terminal device B registers at the base station functionality of the terminal device A and a communication between the terminal device A and the terminal device B is established. Furthermore, the base station functionality of the terminal device A uses the communication link between the terminal device A and the base station for transmitting communication data from the terminal device B to the operator core network and vice versa. The base station functionality of the terminal device A may be deactivated at any time upon receiving a corresponding request from the base station.

The above-described methods require modifications to for example 3GPP standards for example for the signaling between the base station and the terminal device for transitioning the terminal device from a pure terminal device to a repeater or a base station. This may require modifications for example in the radio resource control (RRC) signaling, where this type of request could be a new RRC configuration request. Furthermore, the device-to-device discovery and device-to-device communication needs to be included into the corresponding standards, for example the 3GPP standards.

To sum up, this method covers the possibility to use parts of already proposed functionality in 3GPP systems in a new way by means of adding communication protocol possibilities for converting a terminal device into a repeater. The main purpose may be handling coverage situations in public safety use cases. As an alternative, as described above, a terminal device may be converted into a small cell (femto-cell) base station with its own access rights.

While exemplary embodiments have been described above, various modifications may be implemented in other embodiments. For example, the coverage of the wireless communication system 100 may be extended even further, when the above-described terminal devices are cascaded or put in a chain repeating the repeated signal once more or forming a chain of femto-cells. Furthermore, the above-described repeater and base station functionalities may be combined with each other such that for example terminal device 106 acts as a repeater and terminal device 107 acts additionally as a base station to extend the coverage of the wireless communication system 100 for further terminal devices within the radio frequency range of the terminal device 107.

The invention claimed is:

1. A method for operating a terminal device of a wireless communication system, the terminal device being connected to a base station of the wireless communication system, wherein the method comprises:
   providing an intermediate node functionality at the terminal device, the intermediate node functionality being configured to forward communication data received from the base station to a further terminal device and to forward communication data received from the further terminal device to the base station;
   detecting, by the terminal device, the further terminal device via a direct radio communication between the terminal device and the further terminal device, wherein the further terminal device is located within a radio range of the terminal device, wherein detecting the further terminal device comprises receiving a message from the further terminal device indicating that the further terminal device is not within the radio range of the base station;
   requesting, by the terminal device, permission from the base station to activate the intermediate node functionality;
   receiving from the base station the permission to activate the intermediate node functionality; and
   upon receiving the permission from the base station, activating the intermediate node functionality at the terminal device.

2. The method according to claim 1:
   wherein forwarding the communication data received from the base station to the further terminal device comprises receiving from the base station a radio signal comprising digital data and transmitting a radio signal comprising the digital data in unchanged form as received from the base station; and
   wherein forwarding the communication data received from the further terminal device to the base station comprises receiving from the further terminal device a radio signal comprising digital data and transmitting a radio signal comprising the digital data in unchanged form as received from the further terminal device.

3. The method according to claim 1, wherein the wireless communication network comprises a cellular communication network and the terminal device is registered at a radio cell provided by the base station, wherein the intermediate node functionality comprises a base station functionality comprising:
   establishing a further radio cell;
   providing a cell identifier for the further radio cell, the cell identifier being different from a cell identifier of the radio cell of the base station; and
   registering the further terminal device at the further radio cell.

4. The method according to claim 1, further comprising receiving configuration data from the base station for configuring the intermediate node functionality, the configuration data comprising at least one of a group consisting of:
- a maximum output power of a radio signal for forwarding communication data received from the base station to the further terminal device;
- a cell identifier to be used by the intermediate node functionality in case the intermediate node functionality comprises a base station functionality;
- a neighbor cell identifier of a neighbor base station, the neighbor base station being located in the neighborhood of the base station; and
- a frequency band for a radio signal for forwarding communication data received from the base station to the further terminal device.

5. The method according to claim 1, further comprising:
- receiving from the base station a message to de-activate the intermediate node functionality; and
- de-activating the intermediate node functionality upon receiving the message from the base station.

6. A terminal device for a wireless communication system, the terminal device comprising:
- a transceiver for establishing a data communication between the terminal device and a base station of the wireless communication system and for establishing a data communication between the terminal device and a further terminal device; and
- a processing circuit configured to:
  - detect the further terminal device via a direct radio communication between the terminal device and the further terminal device, wherein the further terminal device is located within a radio range of the terminal device, wherein the terminal device receives a message from the further terminal device indicating that the further terminal device is not within the radio range of the base station;
  - request permission from the base station to activate an intermediate node functionality configured to forward communication data received from the base station to the further terminal device and to forward communication data received from the further terminal device to the base station;
  - receive from the base station the permission to activate the intermediate node functionality; and
  - activate the intermediate node functionality upon receiving the permission from the base station.

7. The terminal device according to claim 6, wherein the terminal device comprises at least one device of a group consisting of a mobile phone, a personal digital assistant, a tablet computer, a laptop computer, and a notebook computer.

* * * * *